United States Patent
Blair

(10) Patent No.: US 8,727,190 B2
(45) Date of Patent: May 20, 2014

(54) BACKPACK HUNTING BLIND

(76) Inventor: James Francis LeRoy Blair, Lanark, IL (US)

(*) Notice: Subject to any disclaimer, the term of this patent is extended or adjusted under 35 U.S.C. 154(b) by 241 days.

(21) Appl. No.: 13/366,306

(22) Filed: Feb. 4, 2012

(65) Prior Publication Data
US 2013/0200125 A1 Aug. 8, 2013

(51) Int. Cl.
*A45F 4/02* (2006.01)
*A45F 4/04* (2006.01)

(52) U.S. Cl.
USPC .............. 224/153; 224/154; 224/190; 135/95

(58) Field of Classification Search
USPC ................ 224/576–577, 153–156, 186–190; 135/95–96, 143, 161, 16
See application file for complete search history.

(56) References Cited

U.S. PATENT DOCUMENTS

| | | | | |
|---|---|---|---|---|
| D228,043 S | * | 7/1973 | Sloop | D3/217 |
| 4,530,451 A | * | 7/1985 | Hamilton | 224/155 |
| 5,203,363 A | * | 4/1993 | Kidwell et al. | 135/90 |
| 6,772,925 B2 | * | 8/2004 | O'Hare | 224/155 |
| 7,219,680 B1 | * | 5/2007 | Gresock | 135/90 |
| 7,427,101 B1 | * | 9/2008 | Zernov | 297/184.14 |
| 2007/0012735 A1 | * | 1/2007 | Lee et al. | 224/155 |
| 2008/0067203 A1 | * | 3/2008 | Culhane | 224/155 |

* cited by examiner

*Primary Examiner* — Justin Larson
*Assistant Examiner* — Scott McNurlen
(74) *Attorney, Agent, or Firm* — Oakwood Law Group, LLP; Yuchien Wei

(57) ABSTRACT

The present invention relates to a backpack hunting blind that may be used, for example, as a hunter blind and backpack frame or the like. In general, the device comprises a partially collapsible mainframe, a seat, a back angle support, and a camouflage cover. The device comprises a partially collapsible mainframe having a first pair of vertical supporting tubes, preferably constructed of aluminum tubing. The first pair of vertical supporting tubes may further contain a second pair of vertical tubes inside which can be pulled out for supporting the camouflage cover. The seat is rotatable and can be rotated from the originally vertical position to a horizontally operational position. Shoulder straps are provided for the hunter to carry the device. The device is lightweight, compact, easy to carry, assemble and disassemble.

20 Claims, 19 Drawing Sheets

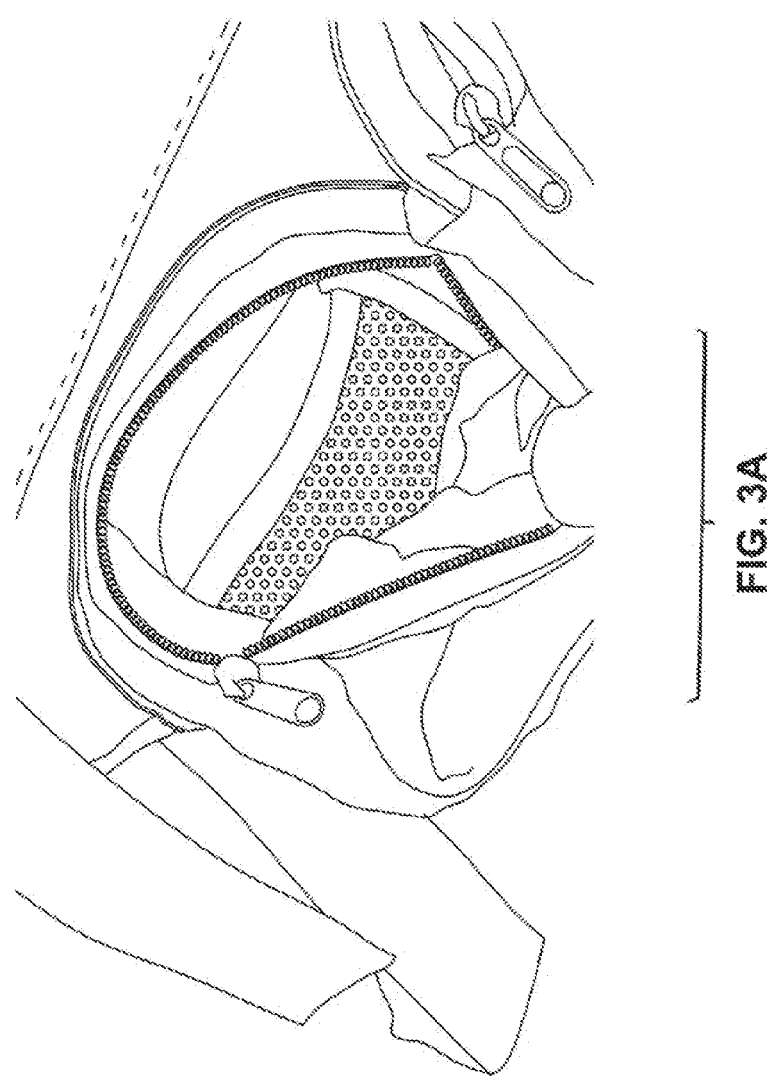

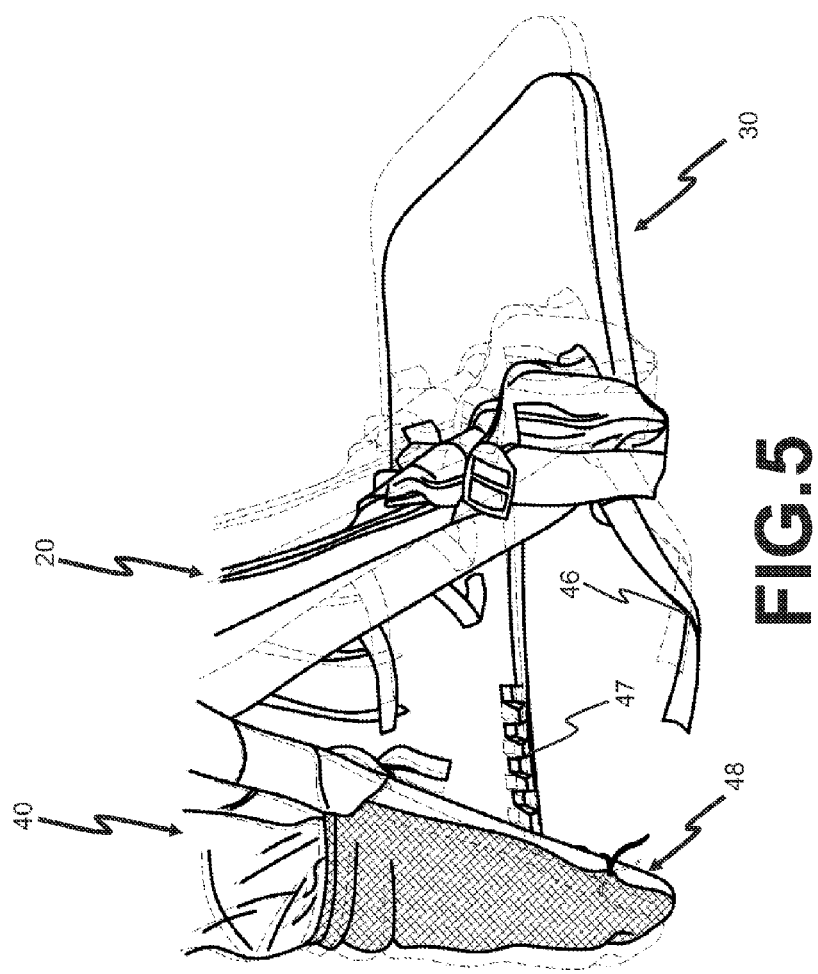

BACKPACK HUNTING BLIND

BACKGROUND OF THE INVENTION

1. Field of the Invention

The present invention relates to a backpack hunting blind, and more particularly to a combination of backpack and hunting blind that is compact and collapsible and can be carried like a normal backpack.

2. Description of Related Art

It is known to use a hunting blind in order to conceal the hunter from the game being hunted or other wildlife. A hunting blind may include a flexible sheet of material with camouflage which blends into the surrounding environment. It is also known that a hunter typically uses a backpack to bring a large quantity of gear including a firearm, ammunition, food, water, optical equipment, extra clothing, etc. to a location where a hunter will engage in hunting. However, because hunting blinds today are often large and heavy, it is difficult for a hunter to carry a large and heavy hunting blind and a backpack full of gear in the field at the same time. Thus, a hunter can only bring a limited supply of gear with him/her. Moreover, because of the size of the blinds, they can create a noticeable object for the wild game to notice and thus divert from that position. While there have been improvements on the ease of setting a blind up, it is still time consuming and challenging for hunters to assemble and disassemble the blind in order to relocate. Many hunters will have multiple blinds because of this problem.

Therefore, there has been a need for a combination of backpack and hunting blinds that is compact and lightweight, easy to carry, set up and disassemble.

Device relating to combination of backpacks and hunting blinds are disclosed in the prior art. More specifically, by way of example, U.S. Pat. No. 6,021,794 to Guerra, discloses a device whose frames are intended as backpacks for carrying the collapsed blinds. However, the resulting backpack does not appear capable of carrying much gear a hunter typically carries including firearm, ammunition, food, water, optical equipment, extra clothing, etc.

U.S. Pat. No. 7,051,908 to Mignano discloses an invention related to a backpack hunting blind to be used in connection with a tree stand. The invention itself does not have frame to support the blind. Thus, it means a hunter needs to bring a tree stand with him/her.

U.S. Pat. No. 7,975,712 to Beacco discloses a hunting blind comprising a frame and a fabric shell supported by and releasably attached to the frame. The invention is not ready for backpacking. The setup of hunting blind is time-consuming.

U.S. Pat. No. 6,698,131 discloses a hunting blind allows the hunter to lie on his back in an inclined position. When the frame is in a fully extended position, the blind takes on a casket-like appearance. The device is somewhat large thus not easy to carry and the hunter needs to lie on his back.

None of the foregoing is believed to carry both the hunting blind and gear well and is compact and lightweight, easy to carry, assemble and disassemble. Therefore, there is still a need for a compact and light weighted device that can be used as a hunting blind and can carry gear required in the field. Meanwhile, the device is easy to carry, assemble and disassemble so that the hunter can readily relocate when necessary.

SUMMARY OF THE INVENTION

The device of the present invention has been developed to provide the hunter with a portable collapsible hunting blind that may be readily converted to a backpack when partial of the mainframe is collapsed. The portable backpack hunting blind of the present invention is simple in construction and relatively inexpensive to produce. Moreover, the backpack hunting blind of the present invention is light weight, compact, easy to carry, assemble and disassemble and can have space to carry necessary gear for hunting.

The backpack hunting blind of the present invention is light weight and can be carried on a hunter's back as a normal backpack. It can be setup and dismantled in less than 2 minutes (each). The device has pouches/pockets that can carry ammunition, game callers, scent blockers, gloves etc. Decoys can be carried in the hunter safety orange mesh bag at the back of the device.

The device can be readily adjusted for small or large people. There is a "roof" which provides some protection in bad weather. The incline of the back can be adjusted for uneven ground as well as the desired angle the hunter desires. The hunter is totally enclosed in camouflage mesh in the front with extra mesh on the sides to prevent the hunter from being 'skylighted'. There is a port in the mesh that allows the hunter to extend the gun through for firing. The mesh is held in place via the hunter's feet to prevent wind movement. The seat, back and head rest have cushions that provide comfort for hunter. The back can be vented for cool carrying in warm weather.

In a preferred embodiment, the backpack hunting blind of the present invention comprises: a mainframe, a seat, a back angle support, and a camouflage cover. The mainframe has a generally planar vertical frame comprising a top and bottom frame members and a pair side members which extend between the top and bottom frame members, a front side facing towards a user's back, a back side facing away from a user's back, a first pair of laterally spaced vertical supporting tubes, a second pair of vertical supporting tubes, a horizontal transverse supporting tube, and a pair of horizontal longitudinal supporting tubes. The first pair of vertical tubes is for supporting the weight from a hunter back. The second pair of vertical tubes is partially contained within the first pair of vertical tubes and can be partially projected or pulled out of and retracted or pushed back into the first pair of vertical pairs. The transverse tube and the longitudinal tubes are connected to the second vertical bars and all for supporting the camouflage cover.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 3A is a close-up view of a pocket inside the outer pouch;

FIG. 5 is a close-up side view showing the seat in an operational position and the means for adjusting the back support angle;

DESCRIPTION OF THE PREFERRED EMBODIMENT

Figure 1A:
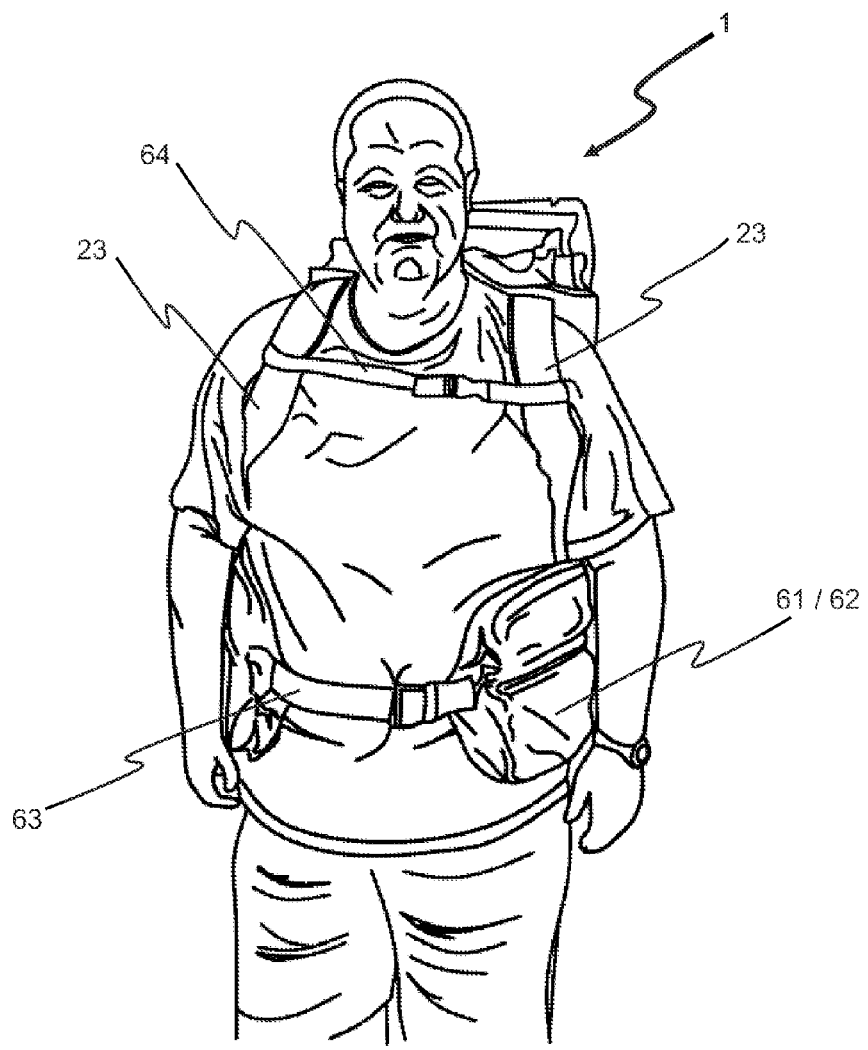
FIG. 1A is a front view showing a hunter wearing a device (backpack with a hunter blind) according to the present invention.
Figure 1B:
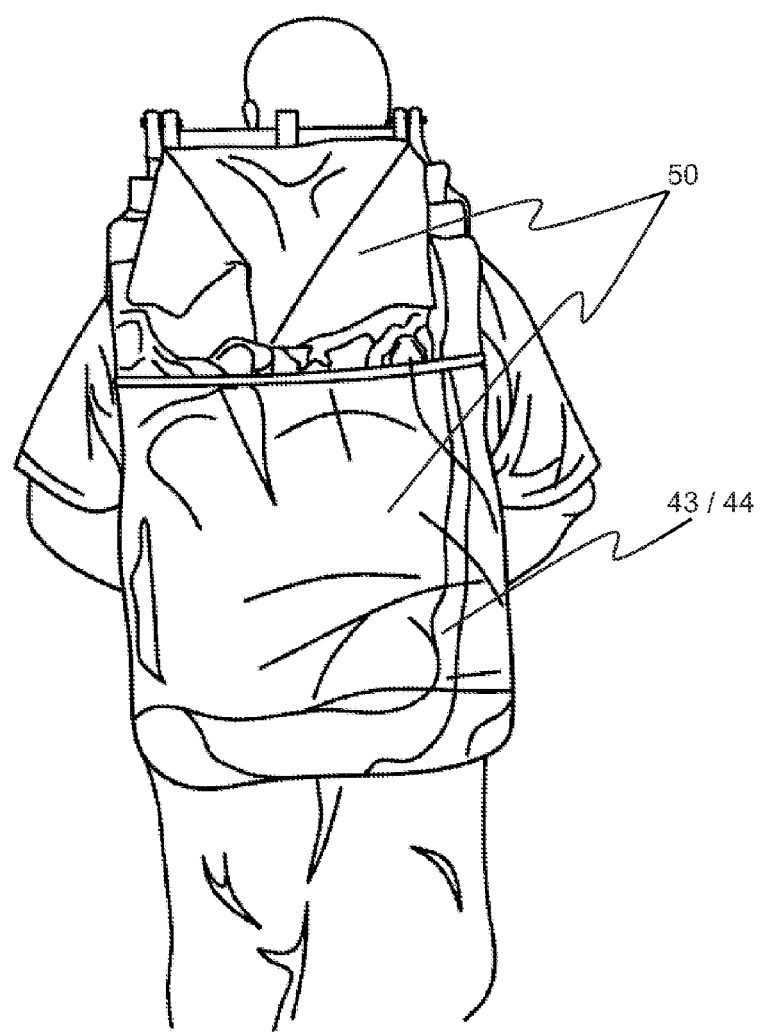
FIG. 1B is a back view of FIG. 1A.

Referring to FIGS. 1A and 1B, there is disclosed the device 1 of the present invention worn on a hunter in a front and rear perspective view. The device 1 has pouches 61 wherein additional pockets 62 reside for carrying gear a hunter typically carries such as including firearm, ammunition, phones, etc. The rear view illustrates more storage space 43 and 44 for carrying a decoy and the compact camouflage cover 50 and shows how little space the camouflage cover 50 takes up.

Figure 2A:
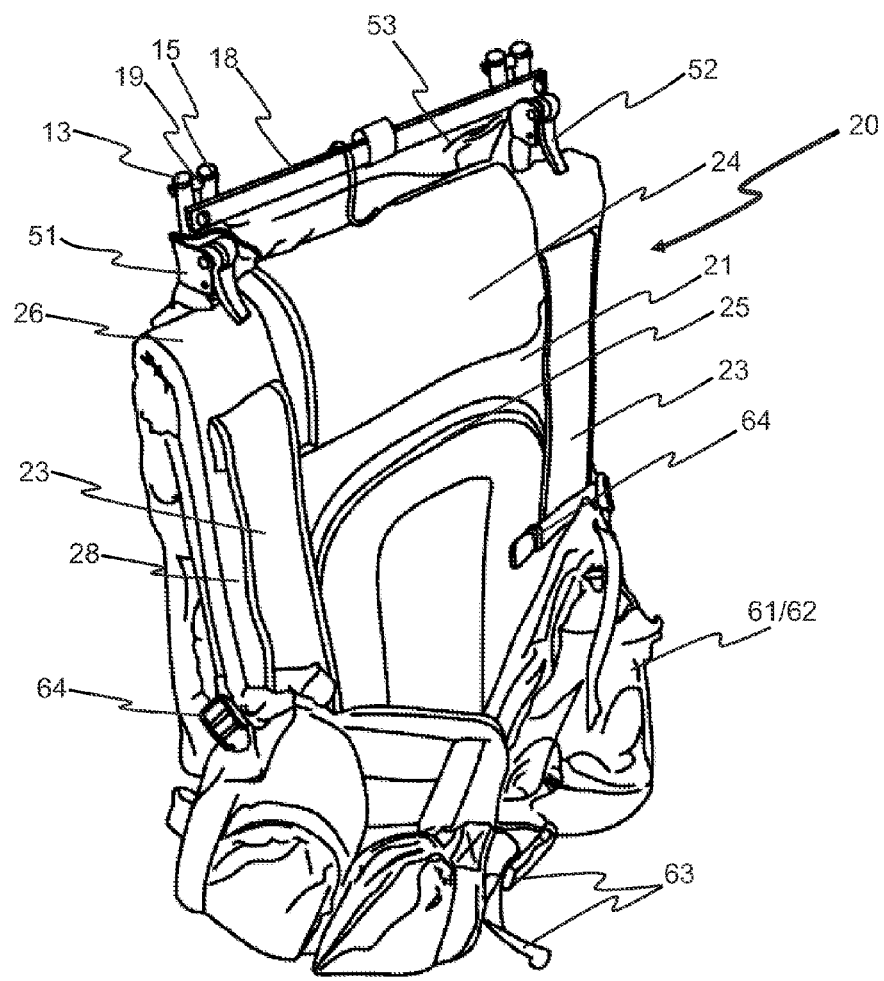
FIG. 2A shows a front perspective view of the device in a folded position where both the seat and hunter blind are folded.
Figure 2B:
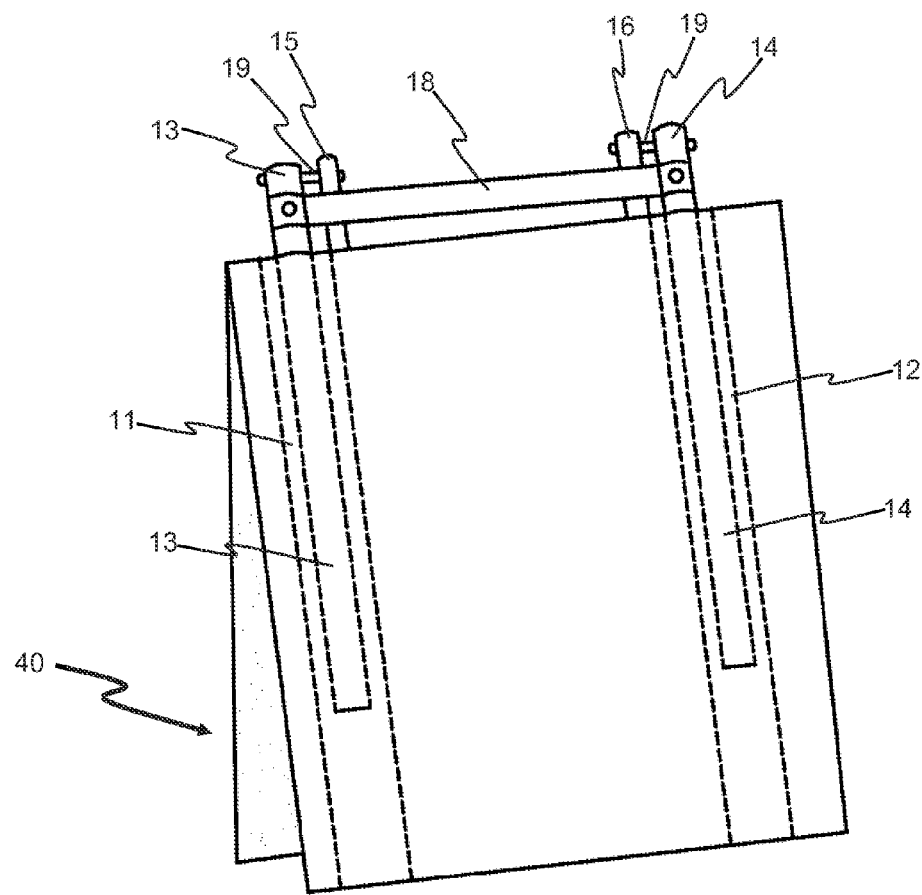
FIG. 2B is a close-up view of the interconnection among the supporting tubes for the camouflage cover.
Figure 2C:
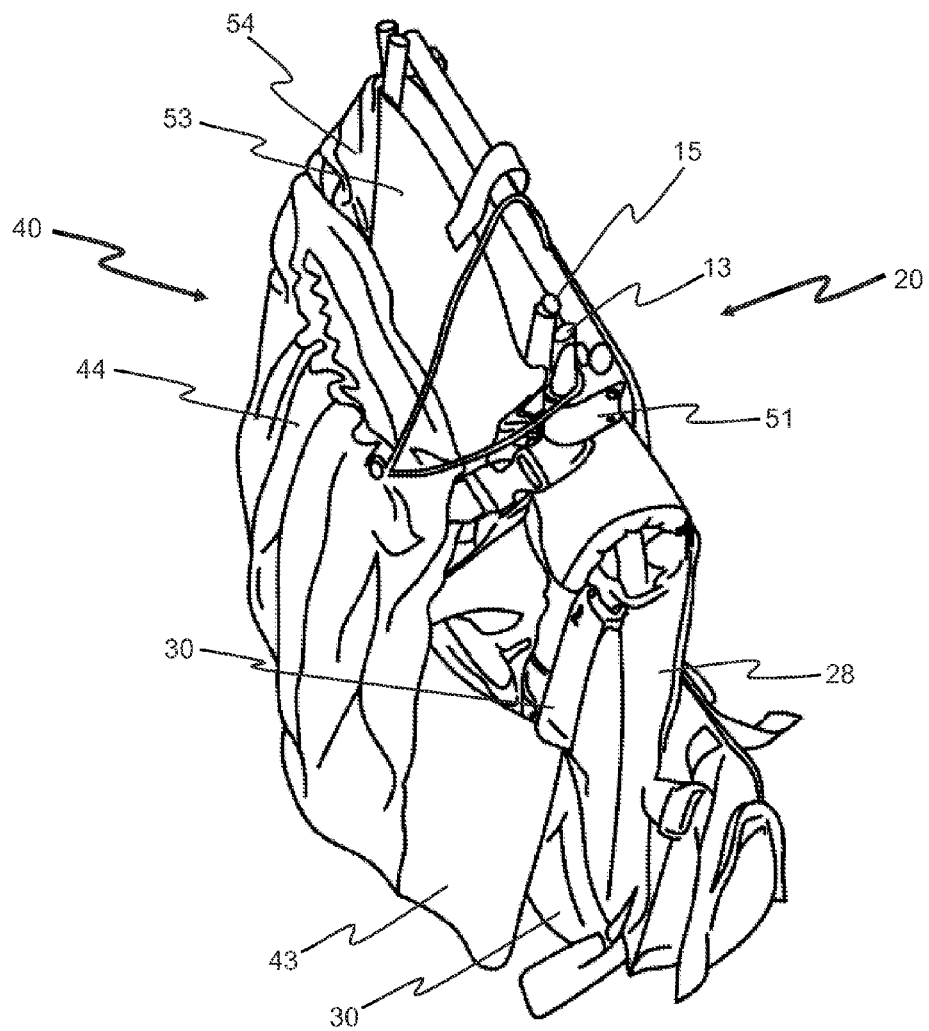
FIG. 2C is a rear perspective view of FIG. 3A.

FIG. 2A shows a front view of the backpack hunting blind 1 of the present invention wherein both the seat and hunter blind are in a stowed position. The backpack hunting blind 1 of the present invention comprises: a mainframe 20, a seat 30, a back angle support 40, and a camouflage cover 50. Structurally, the mainframe 20 has a generally planar vertical frame comprising a top and bottom frame members 26 and 27 and a pair side members 28 and 29 which extend between the top and bottom frame members 26 and 27, a front side 21 facing towards a user's back, a back side 22 facing away from a user's back, a first pair of laterally spaced vertical supporting tubes 11 and 12 ("the stanchions 11 and 12" hereinafter), a second pair of vertical supporting tubes 13 and 14 ("the stanchions 13 and 14" hereinafter), a horizontal transverse supporting tube 18 ("the transverse tube 18" hereinafter), and a pair of horizontal longitudinal supporting tubes 15 and 16 ("the longitudinal tubes 15 and 16" hereinafter). The supporting tubes are constructed of lightweight material such as aluminum, steel, carbon-fiber-enriched-polymer, composite fiber, etc., preferably, aluminum. The stanchions 13 and 14 is partially contained within the stanchions 11 and 12 and can be partially projected or pulled out of and retracted or pushed back into the stanchions 11 and 12. Each end of the transverse tube 18 is connected to the top end of each of the stanchions 13 and 14 (FIG. 2B). The longitudinal tubes 15 and 16 are connected to the stanchions 13 and 14 respectively through a linking means such as a pivot pin assembly 19 and other suitable means that allows the longitudinal tube 15 and 16 to rotate around the stanchions 13 and 14, respectively (FIG. 2B).

The stanchions 13 and 14 are the upright bars supporting the camouflage cover 50. The device 1 may further employ a telescoping mechanism for projecting or pulling and retracting or pushing the stanchions 13 and 14 out of and into the stanchions 11 and 12 so that the device 1 is partially collapsible and compact in stowed position for easy carrying. Other suitable mechanism that can retract and project tubes/bars may also be applied to the device 1. Additionally there is a fastening means, such as clamps 51 and 52 and other suitable means, for locking the stanchions 13 and 14 in place at the desired height. When the camouflage cover 50 is not deployed the stanchions 13 and 14 are retracted into the stanchions 11 and 12. When the camouflage cover 50 is to be deployed, the stanchions 13 and 14 can be projected or pulled out and clamped at desired height to support the camouflage cover 50. Of course, other arrangements of the pieces to form the frame may be used without departing from the invention.

Referring back to FIG. 2A, the front side 21 of the mainframe 20 is the part that has direct contact to a hunter's back when worn by a hunter. In order to provide comforts to hunters, a flexible cloth like material such as nylon or other suitable materials are used to cover the front side 21 and a material such as cell foam or other suitable materials are used for padding and cushioning purpose. The covering and cushioning materials used on the front side 21 are made from the materials typically used for a camping backpack.

The front side 21 has the following features: a pair of shoulder padded straps 23 deposited on the two longitudinal lateral sides allowing a hunter to wear the strap 23 on his shoulders to carry the backpack hunting blind 1 on his back; a padded head rest 24 deposited on the upper section and a padded back support 25 deposited on the middle section. The shoulder strap 23, head rest 24 and back support 25 have cushions that provide comfort for hunter. The back can be vented for cool carrying in warm weather.

A seat 30 (not shown in FIG. 2A) which is connected to the bottom 27 of the mainframe 20 can be rotated from a generally vertical position to a horizontally operational position. The seat 30 may be sewn onto the mainframe's bottom 27 so that the connection is flexible and rotatable. In another embodiment, the seat 30 and the mainframe's bottom 27 are connected through a pivot pin assembly (not shown). Other designs that would allow seat 30 to rotate may be used without departing from the invention. The seat 30 may include a rigid frame structure made of lightweight but strong material such as aluminum, wood or other suitable material and covered by cushioning material and fabric to provide comfort for hunters. But since the seat 30 is laid on the ground it may include only cushion and fabric without a rigid frame structure so as to reduce the total weight of the device 1.

Figure 3B:
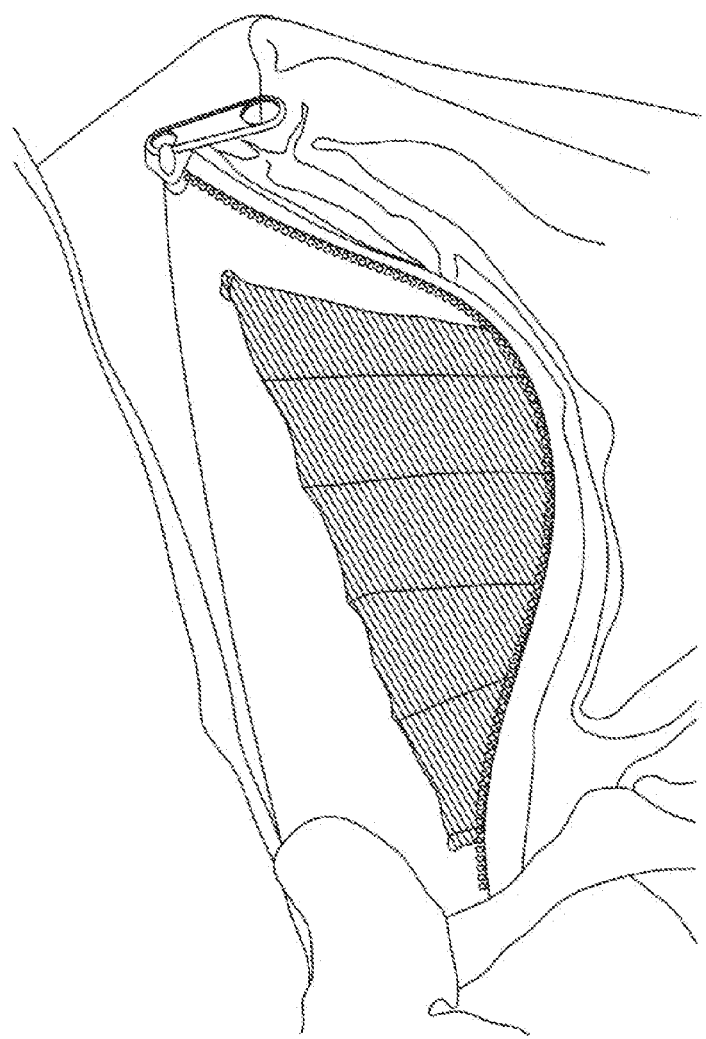
FIG. 3B is a close-up view of a bottom pouch wherein ammo for hunting can be stored.

A plurality of pouches 61 extending from the mainframe's sides 28 and 29 when worn by a hunter (FIG. 1A) will comfortably wrap around the waist and stay on the hunters sides and thus facilitating easiness for a hunter to put stuff in or take stuff out of pouches 61. Inside the pouches 61 there are additional pockets 62 for ammo, calls etc. (FIGS. 3A and 3B). The device 1 further comprises waist belt or strap 63 and straps 64 across the chest for providing additional support (referred to FIG. 1A).

Referring to FIG. 2B, the back angle support 40 is a generally planar vertical frame having a width and length similar to the mainframe 20, extending from the top member 26 of the mainframe 20 and held together to the mainframe 20 at the bottom 27 by a pair of straps with snaps, one on each side. When the device 1 is placed on the ground in an operational position the mainframe 20 and the back angle support 40 form an inverted "V" shape so as to provide stability to the mainframe 20 against a hunter's back. A large pouch 43 for storing the camouflage cover and an orange mesh bag 44 for carrying decoys are attached on the side facing away from the hunter.

As discussed in previous paragraph, the stanchions 13 and 14 supporting the camouflage cover 50 are resting inside the stanchions 11 and 12 within the mainframe 20 in a stowed position. On the top of the mainframe 20, the top ends of both the stanchions 13 and 14, and the longitudinal tubes 15 and 16, as well as the transverse tubes 18 are shown on the top of the mainframe 20 in FIGS. 2A and 2B. Both ends of the transverse tube 18 are connected to the stanchions 13 and 14 at stanchions' top terminal ends. Initially in a stowed position, the stanchions 13 and 14 and longitudinal tubes 15 and 16 are positioned in an upright position while the transverse tube 18 is in a horizontal position. Because the longitudinal tubes 15 and 16 connect to the stanchions 13 and 14 through a pin pivot assembly 19 at the top terminal ends of the stanchions 13 and 14 such that the longitudinal tubes 15 and 16 can rotate clockwise from an upright stowed position to a horizontal operational position (from about 6 o'clock to about 3 o'clock) and rests on the transverse tube 18. The detail structure will be discussed in more detail subsequently herein.

Figure 4:
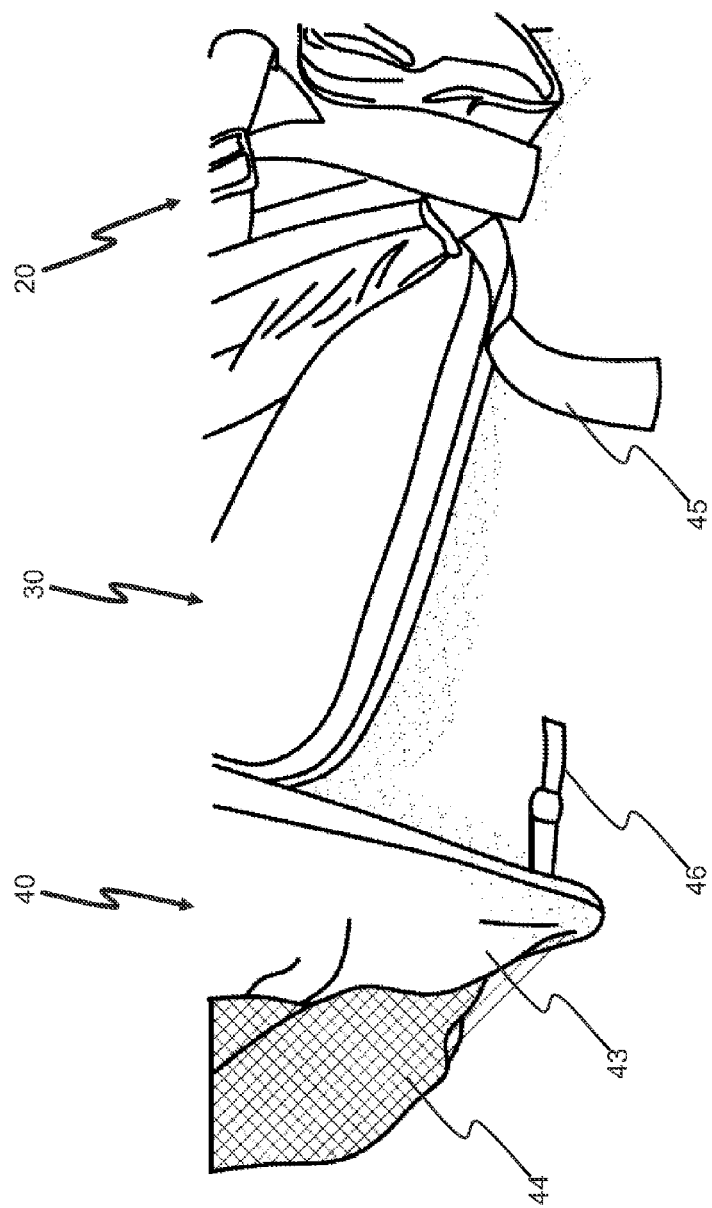
FIG. 4 is a close-up side view showing the seat comes down.

Referring to FIGS. 4 and 5, when in use, the backpack hunting blind 1 is placed on the ground in an upright position; the mainframe 20 and back angle support 40 separate apart at their low portion to form an inverted V shape such that the back angle support 40 can provide support to the mainframe 20 when a hunter's back leans on. The two straps 45 with snaps 46, one on each side holding the back angle support 40 to the mainframe 20 are then released, the seat held in between the mainframe 20 and back angle support 40 starts to come down from the stored position (FIG. 4) and can be rotated in counter-clockwise direction to the operational position (FIG. 5). There are several ways of changing and holding the angle of the back angle support 40. One, as shown, is utilizing gearwheel and gear teeth 47 to adjust the back support angle. Another is using straps 48 and 49 from A to B which would allow for more adjustment as well as would allow for uneven terrain (FIG. 5).

Figure 6A:
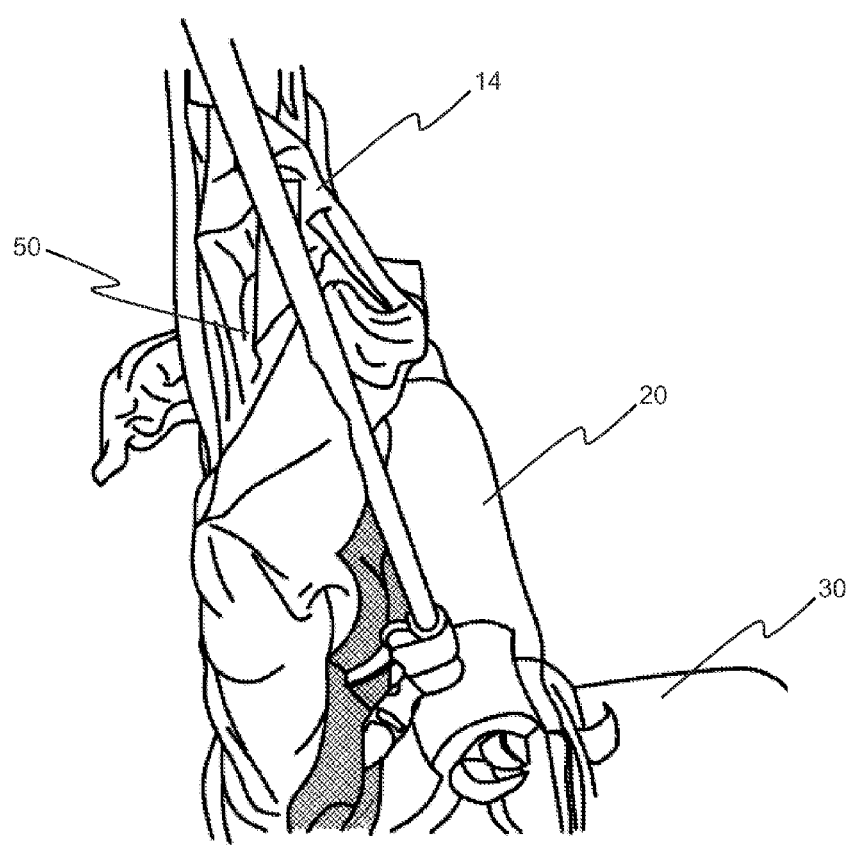
FIG. 6A shows a close-up view of the interconnection among the supporting tubes for the camouflage cover wherein the stanchions 13 and 14 are projected or pulled up from stowed position, the clamp 51 and 52 shown in the figure are in an open position (not clamped)
Figure 6B:
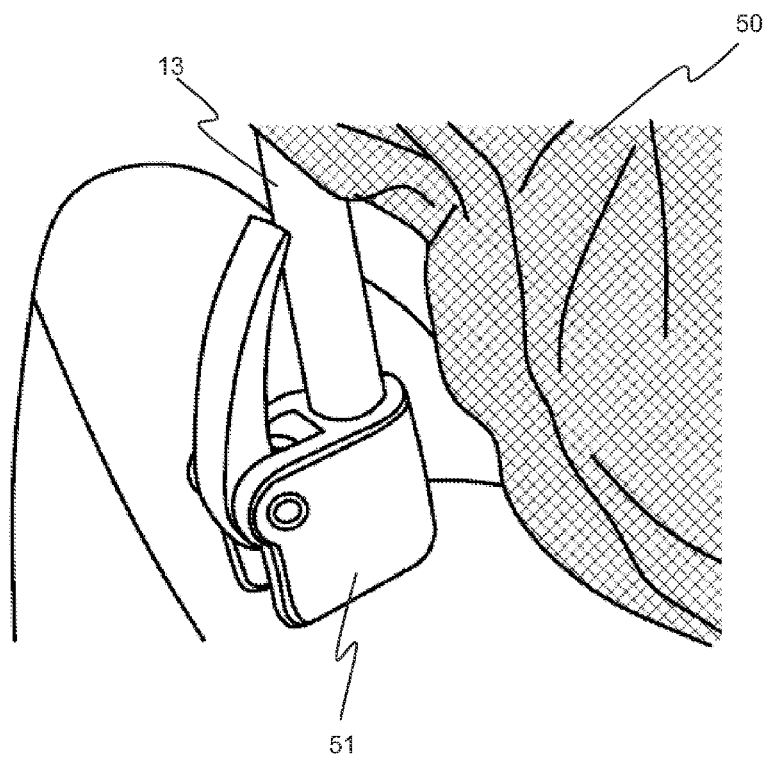
FIG. 6B is a close-up view of the clamp 51 shown in FIG. 6A in a locked position.
Figure 7A:
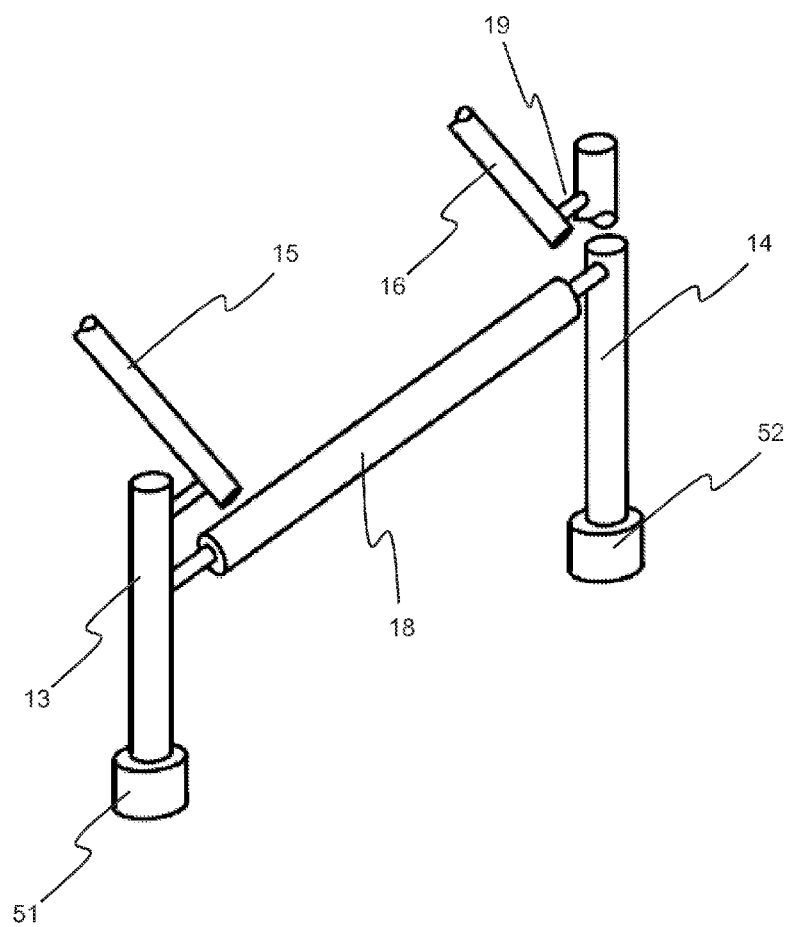
FIG. 7 shows a close-up view of the interconnection among the supporting tubes for the camouflage cover wherein the longitudinal bars 15 and 16 are rotated clockwise from stowed (resting) position to a horizontal position.
Figure 7B:
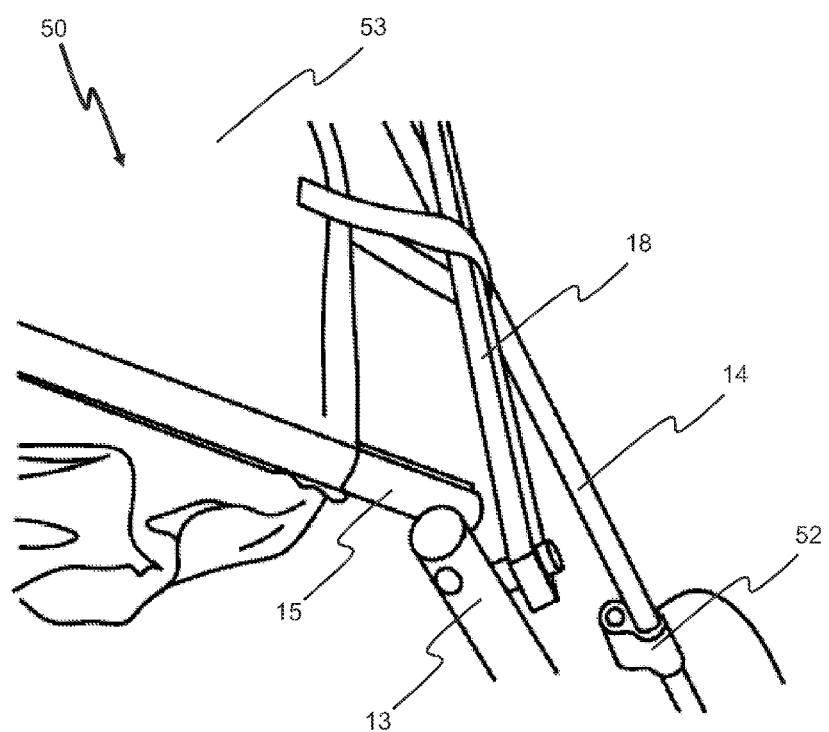
Figure 8:
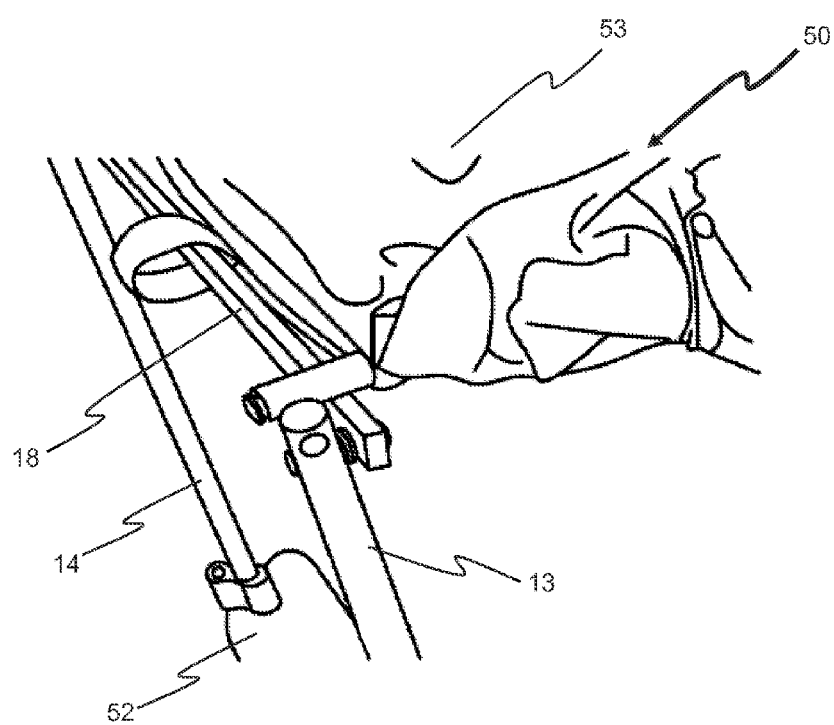
FIG. 8 shows the longitudinal bars 15 and 16 continue to rotate clockwise until they rest on the transverse bar 18 from the position in FIG. 7 to a horizontal operational position.
Figure 9A:
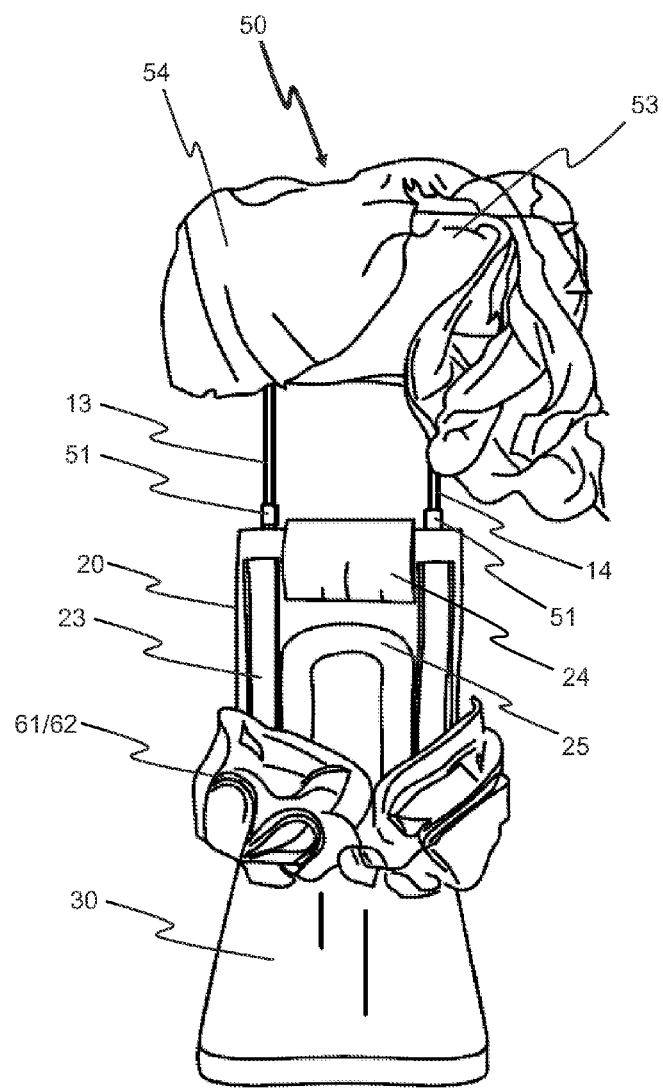
FIG. 9A shows a front view of the device of FIG. 2A in an erected deployed orientation with camouflage cover on top.

The first step in deploying the camouflage cover 50 is to project or pull the stanchions 13 and 14 out of the stanchions 11 and 12 (not shown) and lock the stanchions 13 and 14 at a desired height using the clamps 51 and 52. FIG. 6A shows a close-up view of the interconnection among the supporting tubes for the camouflage cover without camouflage cover wherein the stanchions 13 and 14 have been projected or pulled up from stowed position, the clamp 51 and 52 shown in the figure are in an open position (not clamped). FIG. 6B is a close-up view of the clamp 51 shown in FIG. 6A in a locked position;

The second step in deploying the camouflage cover 50 is to lift the longitudinal tubes 15 and 16 which are connected to the stanchions 13 and 14 through a pin pivot assembly 19. The longitudinal tubes 15 and 16 are rotated clockwise from an upright stowed position (FIG. 6A) to a horizontal position from about 6 o'clock to about 9 o'clock (FIG. 7) and continue to rotate until they rests on the transverse tube 18 in a horizontal operational position (about 3 o'clock) as shown in FIG. 8. In FIGS. 7 and 8, it is clear to view that the camouflage cover is releasably attached to the transverse tube 18 by a strap 55 and is supported on the longitudinal tubes 15 and 16 to form a roof 53 (FIG. 9A).

Figure 9B:
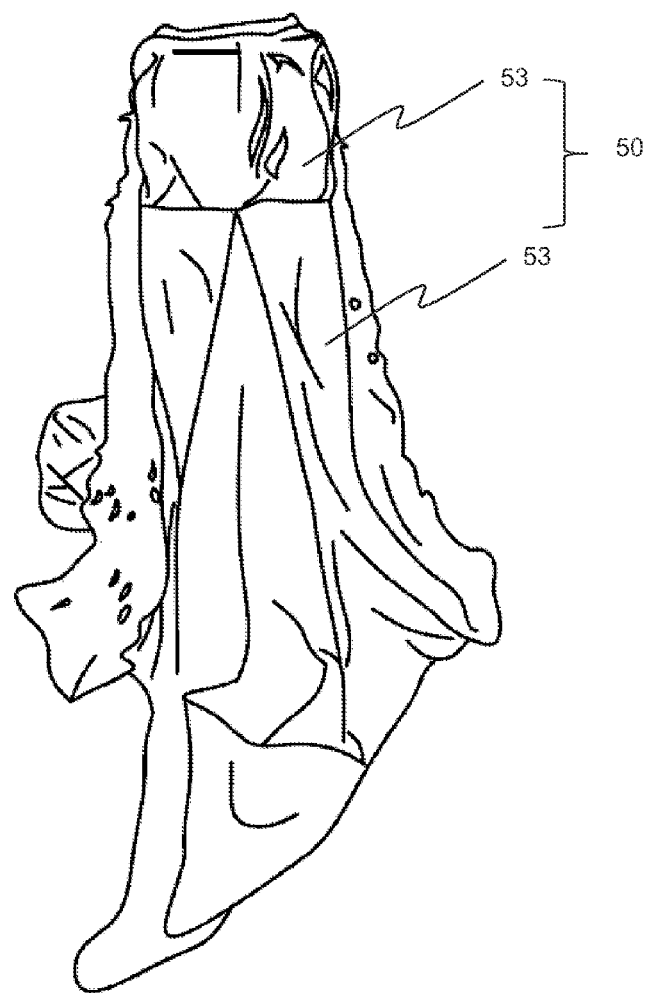
FIG. 9B shows a front view of the device of FIG. 2A in an erected deployed orientation with camouflage cover on sides.
Figure 10:
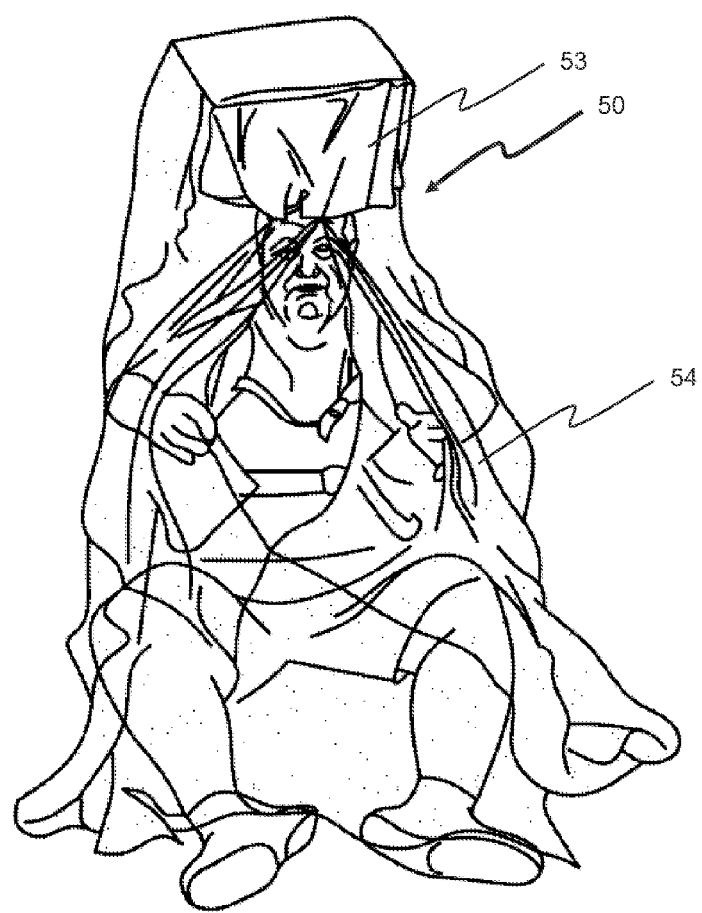
FIG. 10 is a front view showing a hunter inside the camouflage cover of the device according to the present invention.
Figure 11A:
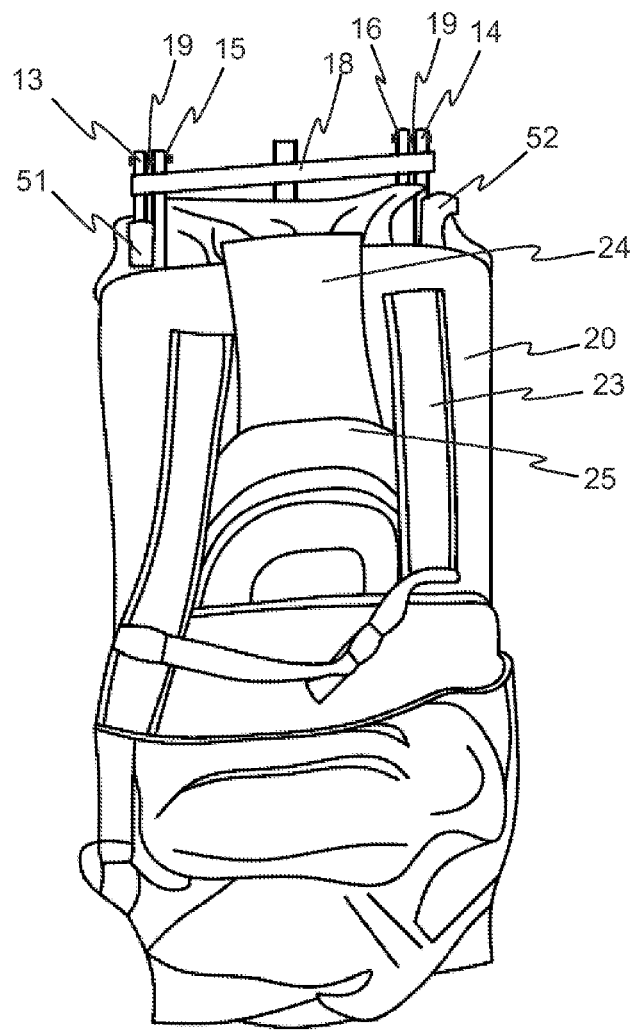
FIGS. 11A and 11B are a front view and rear view of the device after usage and ready for packing.
Figure 11B:
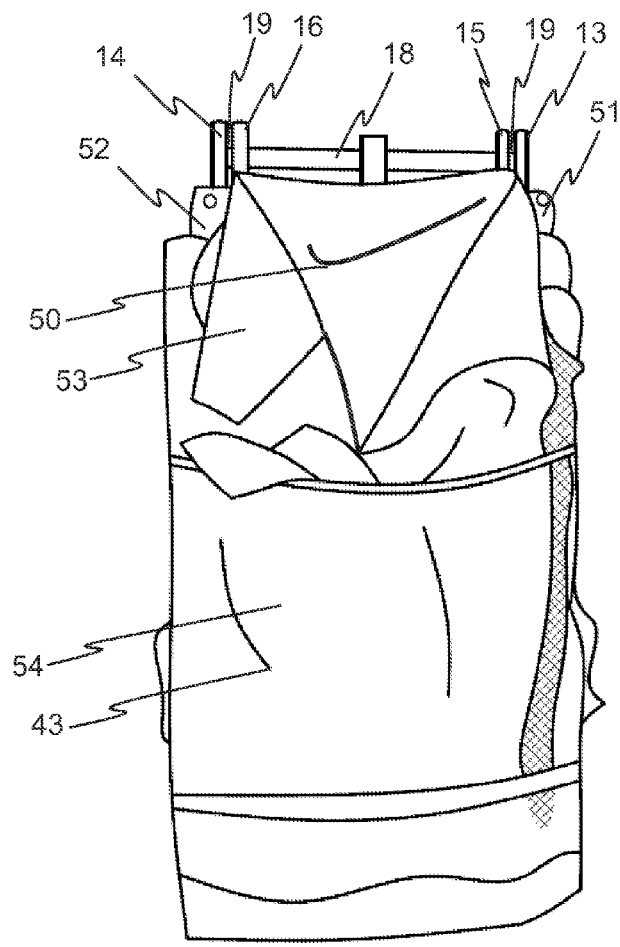

With the cover 50 extended, the camouflage screen 54 can now be extended to the sides. An additional screen on the side is included for added protection against being skylighted/outlined by animals (FIG. 9B). FIG. 10 is a front view showing a hunter sitting inside the camouflage cover 50 of the device 1 completely covered by the roof 53 and camouflage 54 to protect from games. After hunting, all of the movable components can then be folded back into the mesh bag for movement to the next hunting area. FIGS. 11A and 11B show the front and back views of camouflage cover 50 ready for packing. The figures illustrate the simplicity and easiness of the device assembling and disassembling.

The materials used to cover and cushioning the mainframe and back angle support and seat can be the materials used to make normal camping backpack. Although the mainframe supporting bars may be manufactured from various materials, it is desirable that the weight of the device be minimized and yet that the device be durable under ordinary use conditions. In this regard the mainframe supporting bars are made of lightweight and strong material including but is not limited to aluminum, steel, carbon fiber enriched polymer, composite fiber, etc. The pouches/pockets are made of material used to make pockets on the normal backpack. Preferably, the "roof" part of the camouflage is made of water proof material such as canvas, nylon, or other materials suitable to make an umbrella in order to provide protection in bad weather. Preferably, the shoulder straps, head rest, back support, seat are padded for providing comfort to the hunters. The straps and snaps/buckles used to secure the lower portion of the mainframe and back angle support and the straps and snaps/buckles across hunter's chest and waist used to provide additional support are conventional straps and snaps/buckles and are known to those with ordinary skill in the art.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A backpack hunting blind comprising:
   a. a mainframe having a generally planar vertical frame comprising top and bottom frame members and a pair of side members which extend between the top and bottom frame members, a front side facing towards a user's back, a back side facing away from a user's back, a first pair of vertical supporting tubes, a second pair of vertical supporting tubes, a horizontal transverse supporting tube, and a pair of horizontal longitudinal supporting tubes, the second pair of vertical tubes are partially contained within the first pair of vertical tubes and can be partially projected or pulled out of and retracted or pushed back into the first vertical tubes, each end of the horizontal transverse supporting tube is connected to the top end of each of the second pair of vertical tubes at respective first locations on the second pair of vertical supporting tubes, the pair of horizontal longitudinal supporting tubes are connected to the second pair of vertical supporting tubes at respective second locations on the second pair of vertical supporting tubes, the first locations being positioned below the second locations;
   b. a back angle support, including a generally planar vertical frame connected to the top frame member of the mainframe for supporting the mainframe when placed on the ground in an operational position;
   c. a seat pivotally mounted along the transverse edge of the bottom frame member of the mainframe that can be rotated from an originally vertical position to a horizontally operational position; and
   d. a camouflage cover, which is supported on the pair of horizontal longitudinal tubes and attached to the transverse tube, adapted to generally surround a hunter in a sitting position from above the hunter's head to reach the ground when the second pair of vertical tubes are in an extended position, wherein the cover is made of water proof material to provide the hunter protection from bad weather, wherein the horizontal transverse supporting tube is for supporting the pair of horizontal longitudinal supporting tubes when the horizontal longitudinal supporting tubes are supporting the camouflage cover.

2. The backpack hunting blind of claim 1, wherein the supporting tubes are made of lightweight aluminum.

3. The backpack hunting blind of claim 1, wherein the supporting tubes are made of lightweight materials including carbon-fiber-reinforced polymer.

4. The backpack hunting blind of claim 1 wherein part of the mainframe is collapsible by the first pair of vertical tubes being partially projected or pulled out of and retracted or pushed back into the first vertical tubes.

5. The backpack hunting blind of claim 1 further comprising a clamp to lock each of the second pair of vertical tubes at their desired extended position.

6. The backpack hunting blind of claim 1 further comprising a pivot hinge for connecting each of the pair of horizontal longitudinal tubes to the second pair of vertical tubes so that the horizontal longitudinal tubes can rotate from an originally vertical position to an operationally horizontal position.

7. The backpack hunting blind of claim 1 further comprising a gearwheel and gear teeth attached to the back angle support for changing and holding the angle of the back angle support in order to adjust for uneven ground as well as to hold the angle the hunter desires.

8. The backpack hunting blind of claim 1 further comprising a pair of straps with snaps or buckles attached to the bottom frame member of the mainframe and the back angle support for changing and holding the angle of the back angle support.

9. The backpack hunting blind of claim 1, wherein the seat is sewn onto the transverse edge of the mainframe's bottom frame member.

10. The backpack hunting blind of claim 1, wherein the seat is connected to the mainframe's bottom frame member through a pivot pin assembly.

11. The backpack hunting blind of claim 1 further comprising a waist belt or strap with a snap or buckle attached to the mainframe.

12. The backpack hunting blind of claim 1, wherein the front side has a pair of padded shoulder straps, a padded head rest, and a padded back support.

13. The backpack hunting blind of claim 1 further comprising a plurality of pouches and pockets for carrying items including ammunition, game callers, scent blockers, and gloves, the pouches having inside pockets, the pouches extending from the lower portion of the mainframe's side members around the hunter's waist and staying on the hunter's sides when the device is worn and tied on the hunter so as to facilitate access to the items inside the pouches.

14. The backpack hunting blind of claim 1, wherein the camouflage cover has a port in the cover that allows the hunter to extend a gun through for firing.

15. The backpack hunting blind of claim 1 further comprising a hunter safety orange mesh bag for carrying a decoy and a large mesh bag for carrying the camouflage cover.

16. A backpack hunting blind comprising:
   a. a mainframe having a generally planar vertical frame comprising top and bottom frame members and a pair of side members which extend between the top and bottom frame members, a front side facing towards a user's back, a back side facing away from a user's back, a first pair of vertical supporting tubes, a second pair of vertical supporting tubes, a horizontal transverse supporting tube connected to the top end of each of the second pair of vertical tubes at respective first locations on the second pair of vertical supporting tubes, and a pair of horizontal longitudinal supporting tubes connected to the second pair of vertical supporting tubes at respective second locations on the second pair of vertical supporting tubes, the first locations being positioned below the second locations;
   b. a back angle support, including a generally planar vertical frame connected to the top frame member of the mainframe for supporting the mainframe when placed on the ground in an operational position;
   c. a seat connected to the bottom frame member of the mainframe that can be rotated from an originally vertical position to a horizontally operational position;
   d. a camouflage cover;
   e. a fastening means to lock each of the second pair of vertical tubes at a desired extended position;

f. a linking means for connecting each of the pair of horizontal longitudinal tubes to each of the second pair of vertical tubes so that the horizontal longitudinal tubes can rotate from an originally vertical position to an operationally horizontal position, the horizontal transverse supporting tube for supporting the horizontal longitudinal tubes when the horizontal longitudinal tubes are in the operationally horizontal position;

g. a gearwheel and gear teeth attached to the back angle support for changing and holding the angle of the back angle support in order to adjust for uneven ground as well as to hold the angle a hunter desires; and h. a plurality of pouches and pockets for carrying ammunition, game callers, scent blockers, and gloves, the pouches having inside pockets.

17. The backpack hunting blind of claim 16, wherein the seat is connected to the mainframe's bottom frame member through a pivot pin assembly.

18. The backpack hunting blind of claim 16, wherein the second pair of vertical tubes are partially contained within the first pair of vertical tubes and can be partially projected or pulled out of and retracted or pushed back into the first vertical tubes, each end of the transverse tube is connected to the top end of each of the second pair of vertical tubes, wherein the supporting tubes are made of lightweight aluminum.

19. The backpack hunting blind of claim 16, wherein the camouflage cover is supported on the pair of horizontal longitudinal supporting tubes and attached to the horizontal transverse supporting tube, adapted to generally surround a hunter in a sitting position from above the hunter's head to reach the ground when the second pair of vertical tubes are in an extended position, wherein the cover is made of water proof material to provide the hunter protection from bad weather, the camouflage cover has a port in the cover that allows the hunter to extend a gun through for firing.

20. A backpack hunting blind comprising:

a. a mainframe having a generally planar vertical frame comprising top and bottom frame members and a pair of side members which extend between the top and bottom frame members, a front side facing towards a user's back, a back side facing away from a user's back, a first pair of vertical supporting tubes, a second pair of vertical supporting tubes, a horizontal transverse supporting tube, and a pair of horizontal longitudinal supporting tubes, the second pair of vertical tubes are partially contained within the first pair of vertical tubes and can be partially projected or pulled out of and retracted or pushed back into the first vertical tubes, each end of the horizontal transverse supporting tube is connected to the top end of each of the second pair of vertical tubes at respective first locations on the second pair of vertical supporting tubes, the pair of horizontal longitudinal supporting tubes connected to the second pair of vertical supporting tubes at respective second locations on the second pair of vertical supporting tubes, the first locations being positioned below the second locations, wherein the supporting tubes are made of lightweight aluminum;

b. a back angle support, including a generally planar vertical frame connected to the top member of the mainframe for supporting the mainframe when placed on the ground in an operational position;

c. a seat pivotally mounted along the transverse edge of the bottom frame member of the mainframe that can be rotated from an originally vertical position to a horizontally operational position, the seat is sewn onto the transverse edge of the mainframe's bottom frame member;

d. a camouflage cover, which is supported on the pair of horizontal longitudinal tubes and attached to the transverse tube, adapted to generally surround a hunter in a sitting position from above the hunter's head to reach the ground when the second pair of vertical tubes are in an extended position, wherein the cover is made of water proof material to provide the hunter protection from bad weather, the camouflage cover has a port in the cover that allows the hunter to extend a gun through for firing;

e. a clamp to lock each of the second pair of vertical tubes at their desired extended position;

f. a pivot hinge for connecting each of the pair of horizontal longitudinal tubes to each of the second pair of vertical tubes so that the horizontal longitudinal tubes can rotate from an originally vertical position to an operationally horizontal position, the horizontal transverse supporting tube for supporting the pair of horizontal longitudinal supporting tubes when the horizontal longitudinal supporting tubes are in the operationally horizontal position;

g. a gearwheel and gear teeth attached to the back angle support for changing and holding an angle of the back angle support in order to adjust for uneven ground as well as to hold the angle the hunter desires;

h. a plurality of pouches and pockets for carrying items including ammunition, game callers, scent blockers, and gloves, the pouches having inside pockets, the pouches extending from the lower portion of the mainframe's side members around the hunter's waist and staying on the hunter's sides when the device is worn and tied on the hunter so as to facilitate access to the items inside the pouches;

i. a hunter safety orange mesh bag for carrying a decoy; and j. a pouch for carrying the camouflage cover.

* * * * *